United States Patent
Kim et al.

(10) Patent No.: US 10,382,738 B2
(45) Date of Patent: Aug. 13, 2019

(54) METHOD AND APPARATUS FOR PROCESSING IMAGE

(71) Applicant: SAMSUNG ELECTRONICS CO., LTD., Suwon-si (KR)

(72) Inventors: Yuntae Kim, Suwon-si (KR); Geeyoung Sung, Daegu (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/871,202

(22) Filed: Jan. 15, 2018

(65) Prior Publication Data
US 2019/0037196 A1   Jan. 31, 2019

(30) Foreign Application Priority Data
Jul. 31, 2017   (KR) .................. 10-2017-0097122

(51) Int. Cl.
| G06T 15/00 | (2011.01) |
| H04N 13/128 | (2018.01) |
| G02B 27/01 | (2006.01) |
| G06F 3/01 | (2006.01) |
| H04N 13/344 | (2018.01) |

(Continued)

(52) U.S. Cl.
CPC ....... *H04N 13/128* (2018.05); *G02B 27/0172* (2013.01); *G06F 3/011* (2013.01); *G06T 15/005* (2013.01); *H04N 13/344* (2018.05); *H04N 13/383* (2018.05); *H04N 13/395* (2018.05); *G02B 2027/0134* (2013.01); *G02B 2027/0178* (2013.01)

(58) Field of Classification Search
None
See application file for complete search history.

(56) References Cited

U.S. PATENT DOCUMENTS 7,843,402 B2 * 11/2010 Nakadaira .......... G02B 27/2278
                                                    345/6
8,531,519 B1 *  9/2013 Peng ....................... H04N 7/18
                                                    348/139

(Continued)

FOREIGN PATENT DOCUMENTS

| CN | 106257995 A | 12/2016 |
| CN | 104050682 B | 1/2017 |

(Continued)

OTHER PUBLICATIONS

Communication dated Dec. 3, 2018, issued by the European Patent Office in counterpart European Application No. 18171502.0.

(Continued)

*Primary Examiner* — Robert J Craddock
(74) *Attorney, Agent, or Firm* — Sughrue Mion, PLLC

(57) ABSTRACT

An apparatus for processing an image includes: a first display of which an optical focal distance is a first distance; a second display of which an optical focal distance is a second distance; a processor configured to determine a first value of a first pixel of the first display and a second value of a second pixel of the second display according to a depth value of a first image to be output; and an image converging member configured to overlap the first pixel and the second pixel and output the first image corresponding to the depth value.

25 Claims, 9 Drawing Sheets

(51) Int. Cl.
  *H04N 13/383*   (2018.01)
  *H04N 13/395*   (2018.01)

(56) References Cited

U.S. PATENT DOCUMENTS

| | | | | |
|---|---|---|---|---|
| 9,280,951 | B2* | 3/2016 | Hasegawa | G09G 5/14 |
| 2003/0080923 | A1* | 5/2003 | Suyama | G02B 27/2278 |
| | | | | 345/6 |
| 2014/0267941 | A1* | 9/2014 | Ellsworth | G02B 27/017 |
| | | | | 349/5 |
| 2015/0294511 | A1* | 10/2015 | Nishioka | G06T 15/06 |
| | | | | 345/420 |
| 2016/0373714 | A1* | 12/2016 | Lee | H04N 13/128 |
| 2017/0019680 | A1* | 1/2017 | Lee | H04N 19/30 |
| 2017/0143442 | A1 | 5/2017 | Tesar et al. | |

FOREIGN PATENT DOCUMENTS

| | | |
|---|---|---|
| JP | 2014-45473 A | 3/2014 |
| JP | 2017-11520 A | 1/2017 |

OTHER PUBLICATIONS

Kurt Akeley et al. "A Stereo Display Prototype with Multiple Focal Distances", ACM transactions on graphics, vol. 23, No. 3, Aug. 1, 2004 (pp. 804-813).

\* cited by examiner

METHOD AND APPARATUS FOR PROCESSING IMAGE

CROSS-REFERENCE TO RELATED APPLICATION

This application claims priority to Korean Patent Application No. 10-2017-0097122, filed on Jul. 31, 2017 in the Korean Intellectual Property Office, the disclosure of which is incorporated herein in its entirety by reference.

BACKGROUND

1. Field

Methods and apparatuses consistent with exemplary embodiments relate to methods and apparatuses for processing image.

2. Description of the Related Art

Electronic devices and display devices capable of generating a virtual reality (VR) environment have been developed and receive increasing attention. Techniques for realizing augmented reality (AR) and mixed reality (MR) as the next stage of virtual reality (VR) have been studied.

Unlike virtual reality (VR) in which a full virtual world is realized, augmented reality (AR) is a display technology that further increases the effect of reality by superimposing (or combining) a virtual object or information about the environment of the real world on a view of the environment of the real world. While virtual reality (VR) may be applied only to limited fields such as games or virtual experience, AR has the advantage that it may be applied to various real environments. In particular, augmented reality (AR) is attracting attention as a next generation display technology suitable for a ubiquitous environment or an Internet of Things (IoT) environment. Augmented reality (AR) is an example of mixed reality (MR) showing a mixture of the real world and the virtual world (e.g., additional information).

Thus, the technological field for processing and displaying three-dimensional images has gradually expanded. Accordingly, a user-friendly three-dimensional image processing method or a three-dimensional image display method is desirable.

SUMMARY

One or more exemplary embodiments provide methods and apparatuses for outputting a user-friendly image by processing an image. One or more exemplary embodiments also provide methods and apparatuses for outputting a user-friendly three-dimensional image that does not cause dizziness to a viewer.

Additional aspects will be set forth in part in the description which follows and, in part, will be apparent from the description, or may be learned by practice of the presented embodiments.

According to an aspect of an exemplary embodiment, there is provided of an apparatus for processing an image includes: a first display of which an optical focal distance is a first distance; a second display of which an optical focal distance is a second distance; a processor configured to determine a first value of a first pixel of the first display and a second value of a second pixel of the second display according to a depth value of a first image to be output; and an image converging member configured to overlap the first pixel and the second pixel and output the first image corresponding to the depth value.

The processor may control a range of the depth value, at which the first pixel of the first display and the second pixel of the second display are simultaneously displayed, to be within a predetermined range.

When the second distance is greater than the first distance, an upper limit of the predetermined range may be smaller than the second distance, and a lower limit of the predetermined range may be greater than the first distance.

The first distance and the second distance may be determined according to physical characteristics of the first display and the second display, respectively.

The second distance may be greater than the first distance, and the processor may determine the first value of the first pixel to be greater than the second value of the second pixel in response to an average value of the first distance and the second distance being greater than the depth value.

The second distance may be greater than the first distance, and the processor may determine a weight applied to the first value of the first pixel to be greater than a weight applied to the second value of the second pixel in response to an average value of the first distance and the second distance being greater than the depth value.

The first value of the first pixel may include a brightness value of the first pixel and the second value of the second pixel includes a brightness value of the second pixel.

The processor may generate an additional image in which a binocular parallax is reflected on the first image, and the image converging member may output the additional image.

The first image may be output to one of a left eye and a right eye of a user and the additional image may be output to another one of the left eye and the right eye of the user.

The processor may determine the first value of the first pixel and the second value of the second pixel corresponding to the depth value according to a look up table (LUT).

According to an aspect of another exemplary embodiment, there is provided a method for processing an image including: obtaining a depth value of a first image to be output; determining, based on the depth value, a first value of a first pixel of a first display of which an optical focal distance is a first distance and determining a second value of a second pixel of a second display of which an optical focal distance is a second distance; and overlapping the first pixel and the second pixel to output the first image corresponding to the depth value.

The determining may include controlling a range of the depth value at which the first pixel of the first display and the second pixel of the second display are simultaneously displayed to be within a predetermined range.

When the second distance is greater than the first distance, an upper limit of the predetermined range may be smaller than the second distance, and a lower limit of the predetermined range may be greater than the first distance.

The first distance and the second distance may be determined according to a physical characteristics of the first display and the second display, respectively.

The second distance may be greater than the first distance, and the determining may include determining the first value of the first pixel to be greater than the second value of the second pixel in response to an average value of the first distance and the second distance being greater than the depth value.

The second distance may be greater than the first distance, and the determining may include determining a weight applied to the first value of the first pixel to be greater than a weight applied to the second value of the second pixel in response to an average value of the first distance and the second distance being greater than the depth value.

The first value of the first pixel may include a brightness value of the first pixel and the second value of the second pixel includes a brightness value of the second pixel.

The method may further include outputting an additional image in which a binocular parallax is reflected on the first image.

The first image may be output to one of a left eye and a right eye of a user and the additional image may be output to another one of the left eye and the right eye of the user.

The determining may include determining the first value of the first pixel and the second value of the second pixel corresponding to the depth value according to a look up table.

According to an aspect of another exemplary embodiment, there is provided a non-transitory computer-readable recording medium that stores a program which, when executed by a computer, implements the above method.

According to an aspect of another exemplary embodiment, there is provided a method of processing an image, including: receiving an input image including a depth value; modulating the depth value to be within a predetermined range based on a first optical focal distance of a first display and a second optical focal distance of a second display; determining a first value of a first pixel of the first display and a second value of a second pixel of the second display according to the modulated depth value, the second pixel having a position corresponding to a position of the first pixel; and outputting an output image based on the value of the first pixel and the value of the second pixel.

The method may further include normalizing the depth value prior to the modulating.

The depth value may be modulated by using depth value modulation data stored in a look up table.

The LUT may be provided by using a depth value modulation function including a sigmoid function.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
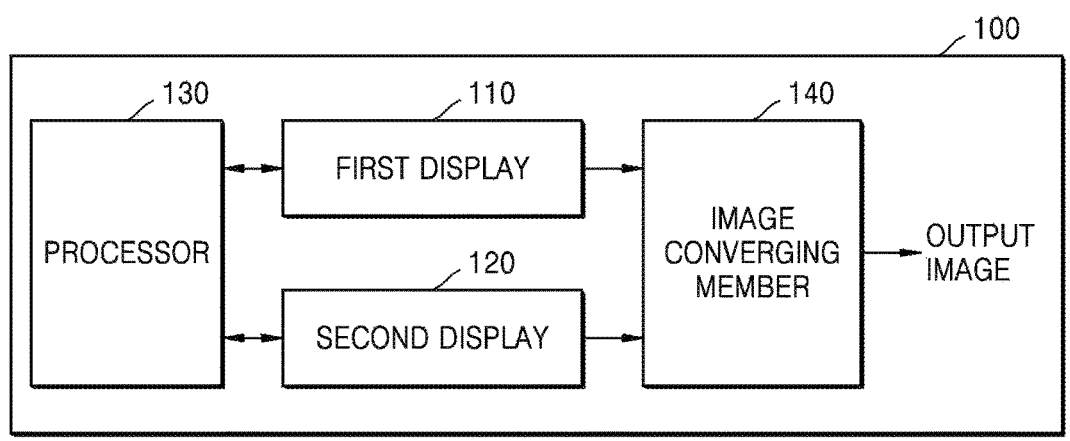
FIG. 1 is a block diagram illustrating an apparatus for processing an image according to an exemplary embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects.

As used herein, the terms 'comprises' or 'comprising' and the like should not be construed as necessarily including various elements or steps described in the specification and should be interpreted not to include some elements or some steps or to include additional elements or steps.

Also, as used herein, the terms including ordinals such as "first" or "second" may be used to describe various elements, but the elements should not be limited by the terms. The terms are used only for the purpose of distinguishing one element from another.

The exemplary embodiments are directed to a method and a device for processing an image, and detailed descriptions thereof will be omitted with respect to matters widely known to one of ordinary skill in the art to which the exemplary embodiments below belong.

In the specification, an image may include a moving image as well as a still image.

FIG. 1 is a block diagram illustrating an apparatus for processing an image according to an exemplary embodiment.

As shown in FIG. 1, an image processing apparatus may include a first display 110, a second display 120, a processor 130, and an image converging member 140. However, it will be understood by one of ordinary skill in the art that other elements such as a general-purpose element in addition to the elements shown in FIG. 1 may be further included in the image processing apparatus 100. Alternatively, it will be understood by one of ordinary skill in the art that, according to another exemplary embodiment, some of the elements shown in FIG. 1 may be omitted.

Referring to FIG. 1, the image processing apparatus 100 may include the first display 110 and the second display 120. Also, optical focal distances of the first display 110 and the second display 120 may be different from each other. The image processing apparatus 100 is a multi-focal display device having two or more focal planes and may display a natural stereoscopic image that causes substantially no dizziness to a viewer. Also, the image processing apparatus 100 may be a display device having identical accommodation and convergence as an autostereoscopic display device.

In the related art, when an output image has a depth value that is different from optical focal distances of display devices of the multi-focal display device, it may cause dizziness to the viewer. For example, in a multi-focal display device where the first display has an optical focal distance of 1 m and the second display has an optical focal distance of 10 m, when an image having a depth value of 7 m is displayed on the first display and the second display, the viewer may feel dizziness. An apparatus for processing an image according to an exemplary embodiment may perform modulation of a depth value to avoid dizziness to the viewer.

Referring to FIG. 1, the first display 110 may output an image (e.g., a 1-1th image), and the second display 120 may output an image (e.g., a 1-2th image). For example, the first display 110 may include an image generating device to generate the 1-1th image, and the second display 120 may include an image generating device to generate the 1-2th image. The first display 110 may generate the 1-1th image according to control of the processor 130 to output the 1-1th image to the image converging member 140 and the second display 120 may generate the 1-2th image according to control of the processor 130 to output the 1-2th image to the image converging member 140.

The image converging member 140 may converge the 1-1th image obtained from the first display 110 and the 1-2th image obtained from the second display 120 and output a converged image.

The image converging member 140 according to an exemplary embodiment may include a multipath optical member that provides an optical multipath. For example, the multipath optical member included in the image converging member 140 may output only a part of light representing the 1-1th image and a part of light representing the 1-2th image.

The optical focal distance of the first display 110 may be set to be a first distance. The optical focal distance of the second display 120 may be set to be a second distance. The first distance and the second distance may be different from each other. For example, the second distance may be greater than the first distance. Although the second distance may be smaller than the first distance, a case where the second distance is greater than the first distance will be described below for convenience of explanation.

The optical focal distance may be determined according to a physical characteristic of a display. For example, the first distance may be determined according to a physical characteristic of the first display 110, and the second distance may be determined according to a physical characteristic of the second display 120. In this case, the first distance may be determined according to an optical design scheme of the first display 110, and the second distance may be determined according to an optical design scheme of the second display 120.

The processor 130 according to an exemplary embodiment may determine pixel values of the 1-1th image and the 1-2th image according to a depth value corresponding to the image output from the image converging member 140.

For example, when the depth value of the image to be output is equal to the first distance, the processor 130 may set an output ratio of the 1-1th image to 100% and an output ratio of the 1-2th image to 0%.

As another example, when the depth value of the image to be output is equal to the second distance, the processor 130 may set the output ratio of the 1-1th image to 0% and the output ratio of the 1-2th image to 100%.

As another example, when the depth value of the image to be output is equal to an average value of the first distance and the second distance, the processor 130 may set the output ratio of the 1-1th image to 50% and the output ratio of the 1-2th image to 50%. In this case, a ratio of the pixel value of the 1-1th image to the pixel value of the 1-2th image may be 1.

Positions of pixels of the 1-1th image and pixels of the 1-2th image may correspond to each other. For example, the pixels of the 1-1th image and the pixels of the 1-2th image may overlap each other and output in an output image. Also, as will be described later, positions of a first pixel output from the first display 110 and a second pixel output from the second display 120 may correspond to each other. For example, the first pixel and the second pixel may overlap each other and output.

The processor 130 according to an exemplary embodiment may compare the depth value corresponding to the image output from the image converging member 140 with the average value of the first distance and the second distance to determine the pixel values of the 1-1th image and the 1-2th image.

For example, when the average value of the first distance and the second distance is greater than the depth value of the image to be output and the first distance is smaller than the second distance, the processor 130 may determine a value of the first pixel output from the first display 110 to be greater than a value of the second pixel output from the second display 120. For example, when the second distance is 11 m, the first distance is 1 m, and the depth value of the image to be output is 3 m, the processor 130 may determine a brightness value of the first pixel of the 1-1th image to be greater than a brightness value of the second pixel of the 1-2th image.

As another example, when the average value of the first distance and the second distance is smaller than the depth value of the image to be output and the first distance is smaller than the second distance, the processor 130 may determine the value of the first pixel output from the first display 110 to be smaller than the value of the second pixel output from the second display 120. For example, when the second distance is 11 m, the first distance is 1 m, and the depth value of the image to be output is 8 m, the processor 130 may determine the brightness value of the first pixel of the 1-1th image to be smaller than the brightness value of the second pixel of the 1-2th image.

As another example, when the average value of the first distance and the second distance is greater than the depth value of the image to be output and the first distance is smaller than the second distance, the processor 130 may determine a weight applied to the value of the first pixel output from the first display 110 to be greater than a weight applied to the value of the second pixel output from the second display 120. For example, when the second distance is 11 m, the first distance is 1 m, and the depth value of the image to be output is 3 m, the processor 130 may determine a weight applied to the brightness value of the first pixel of the 1-1th image to be greater than a weight applied to the brightness value of the second pixel of the 1-2th image.

As another example, when the average value of the first distance and the second distance is smaller than the depth value of the image to be output and the first distance is smaller than the second distance, the processor 130 may determine the weight applied to the value of the first pixel output from the first display 110 to be smaller than the weight applied to the value of the second pixel. For example, when the second distance is 11 m, the first distance is 1 m, and the depth value of the image to be output is 8 m, the processor 130 may determine the weight applied to the brightness value of the first pixel of the 1-1th image to be smaller than the weight applied to the brightness value of the second pixel of the 1-2th image.

The processor 130 according to an exemplary embodiment may determine a range of a depth value at which the 1-1th image and the 1-2th image are simultaneously output to be within a predetermined range when determining the pixel values of the 1-1th and 1-2th images according to the depth value corresponding to the image to be output.

For example, when the second distance is greater than the first distance, the processor 130 may determine that a maximum value of the depth value at which the 1-1th image and the 1-2th image are simultaneously output is smaller than the second distance and that a minimum value of the depth value at which the 1-1th image and the 1-2th image are simultaneously output is greater than the first distance. For example, when the second distance is 11 m and the first distance is 1 m, the processor 130 may determine the maximum value of the depth value at which the 1-1th image and the 1-2th image are simultaneously output as 10 m that is less than the second distance of 11 m and the minimum value of the depth value at which the 1-1th image and the 1-2th image are simultaneously output as 2 m that is greater than the first distance of 1 m.

The first display 110 and/or the second display 120 may include, for example, a spatial light modulator (SLM). The SLM may be a transmissive optical modulator or a reflective optical modulator, or a transflective optical modulator. As an example, the SLM may include a liquid crystal on silicon (LCoS) panel, a liquid crystal display (LCD) panel, a digital light projection (DLP), etc. Here, the DLP panel may include a digital micromirror device (DMD). The first display 110 and/or the second display 120 may include the transmissive optical modulator. Although not shown, the first display 110 and/or the second display 120 may further include a light source for irradiating light. According to embodiments, the first display 110 and/or the second display 120 may include a light emitting diode (LED) display device or an organic LED (OLED) display device. An image implemented by using the first display 110 and/or the second display 120 may be a two-dimensional (2D) image or a three-dimensional (3D) image. A 3D image implemented by using the first display 110 and/or the second display 120 may include a hologram image, a stereo image, a light field image, an integral photography (IP) image, or the like. The first display 110 and/or the second display 120 may include a kind of a display device or a micro-display device, and the configuration thereof is not limited to the above descriptions and may vary.

The image processing apparatus 100 according to an exemplary embodiment may be a multi-image display apparatus or a see-through type display apparatus. For example, the image processing apparatus 100 may transmit an external image acquired from the outside of the image processing apparatus 100 as well as an image generated based on the 1-1th and 1-2th images to a user's visual organ. A method in which the image processing apparatus 100 outputs not only the image generated based on the 1-1th image and the 1-2th image but also the external image will be described later with reference to FIG. 8.

The image processing apparatus 100 according to an exemplary embodiment may output one image or a plurality of images. For example, the image processing apparatus 100 may output two images.

For example, when the image processing apparatus 100 outputs a first image and a second image, the first image may be output to a left eye of the user, and the second image may be output to a right eye of the user. Alternatively, the first image may be output to the right eye of the user, and the second image may be output to the left eye of the user. A 3D image may be output according to a disparity between the first image and the second image.

The image processing apparatus 100 may perform a pixel rendering method that expresses a natural image through a multi-focus display method that matches focus information between a real world and a virtual image. For example, in the case of outputting an image in which a depth value continuously changes, the image processing apparatus 100 may output a natural image by controlling a range of a depth value at which a plurality of displays having different optical focal distances are simultaneously displayed.

Figure 2:
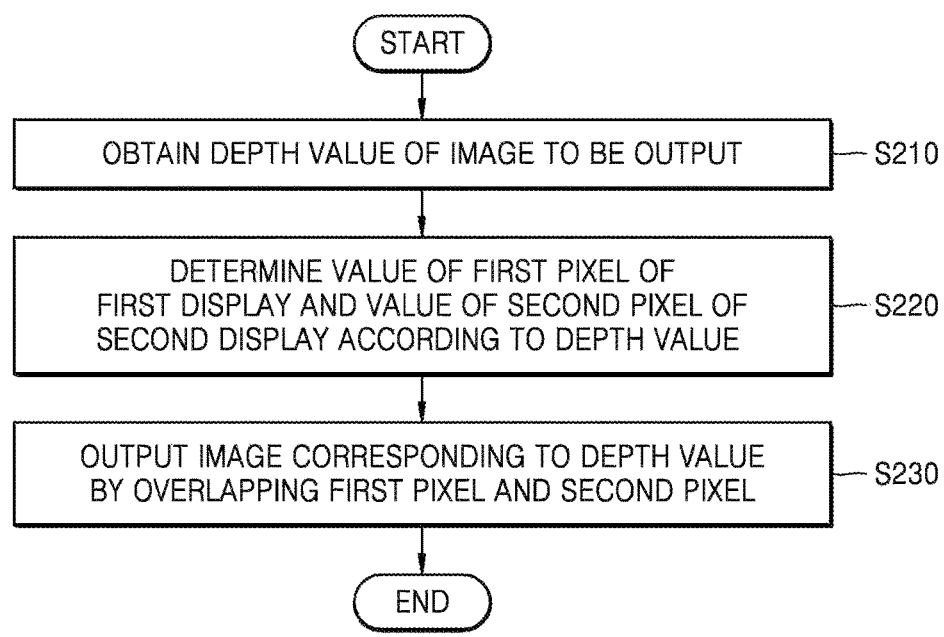
FIG. 2 is a flowchart illustrating a method of outputting an image according to an exemplary embodiment.

FIG. 2 is a flowchart illustrating a method in which the image processing apparatus 100 outputs an image according to an exemplary embodiment.

In operation S210, the image processing apparatus 100 according to an exemplary embodiment may obtain a depth value of an image to be output.

The image to be output may be a 3D image. When the image to be output is the 3D image, the image processing apparatus 100 may obtain the depth value corresponding to the image to be output. The image processing apparatus 100 may receive the depth value corresponding to the image to be output or determine the depth value corresponding to the image to be output through calculation.

In operation S220, the image processing apparatus 100 according to an exemplary embodiment may determine a value of a first pixel of the first display 110 in which an optical focal distance is set to a first distance and a value of a second pixel of the second display 120 in which the optical focal distance is set to a second distance, according to the depth value obtained in operation S210. The first distance and the second distance may be different from each other. Hereinafter, the case where the second distance is greater than the first distance will be described for convenience of explanation.

The optical focal distance may be determined according to a physical characteristic of a display. For example, the first distance may be determined according to a physical characteristic of the first display 110, and the second distance may be determined according to a physical characteristic of the second display 120. In this case, the first distance may be determined according to an optical design scheme of the first display 110, and the second distance may be determined according to an optical design scheme of the second display 120.

Positions of the first pixel output from the first display 110 and the second pixel output from the second display 120 may correspond to each other. For example, the first pixel and the second pixel may overlap each other and output.

The image processing apparatus 100 according to an exemplary embodiment may determine the value of the first pixel and the value of the second pixel according to the depth value corresponding to the image output from the image processing apparatus 100.

For example, when the depth value of the image to be output is equal to the first distance, the image processing apparatus 100 may set an output ratio of a brightness value of the first pixel to 100% and an output ratio of a brightness value of the second pixel to 0% to output the image.

As another example, when the depth value of the image to be output is equal to a second distance, the image processing apparatus 100 may set the output ratio of the brightness value of the first pixel to 0% and the output ratio of the brightness value of the second pixel to 100% to output the image.

As another example, when the depth value of the image to be output is equal to an average value of the first distance and the second distance, the image processing apparatus 100 may set the output ratio of the brightness value of the first pixel to 50% and the output ratio of the brightness value of the second pixel to 50%.

As another example, when the average value of the first distance and the second distance is greater than the depth value of the image to be output, the image processing apparatus 100 may determine the brightness value of the first pixel to be greater than the brightness value of the second pixel. For example, in a case where the second distance is 11 m, the first distance is 1 m, and the depth value of the image to be output is 3 m, the image processing apparatus 100 may determine the brightness value of the first pixel to be greater than the brightness value of the second pixel.

As another example, when the average value of the first distance and the second distance is greater than the depth value of the image to be output, the image processing apparatus 100 may determine a weight applied to the brightness value of the first pixel to be greater than a weight value applied to the brightness value of the second pixel. For example, when the second distance is 11 m, the first distance is 1 m, and the depth value of the image to be output is 3 m, the processor 130 may determine the weight applied to the brightness value of the first pixel to be greater than the weight applied to the brightness value of the second pixel.

When determining the first pixel value according to the depth value of the image to be output, the image processing apparatus 100 according to an exemplary embodiment may determine a range of a depth value at which an image of the first display 110 and an image of the second display 120 are simultaneously output to be within a preset range.

For example, when the second distance is greater than the first distance, the image processing apparatus 100 may determine a maximum value of a depth value at which the first pixel and the second pixel are simultaneously output to be smaller than the second distance, and a minimum value of the depth value at which the first pixel and the second pixel are simultaneously output to be greater than the first distance. For example, in a case where the second distance is 11 m and the first distance is 1 m, the image processing apparatus 100 may determine the maximum value of the depth value at which the first pixel and the second pixel are simultaneously output as 10 m that is less than the second distance of 11 m, and determine the minimum value of the depth value at which the first pixel and the second pixel are simultaneously output as 2 m that is greater than the first distance of 1 m.

In operation S230, the image processing apparatus 100 according to an exemplary embodiment may output an image corresponding to the depth value by overlapping the first pixel and the second pixel.

The first pixel and the second pixel may be overlapped and output. For example, the image converging member 140 may overlap and output the first pixel and the second pixel. The image converging member 140 may converge a pixel value obtained from the first pixel and a pixel value obtained from the second pixel at the same position and output the converged pixel value. For example, the image converging member 140 may output a third pixel value based on convergence of the first pixel and the second pixel. A position of the third pixel in an output image may correspond to the positions of the first pixel and the second pixel. The image converging member 140 may include at least one from among a beam splitter and a transflective film.

Figure 3:
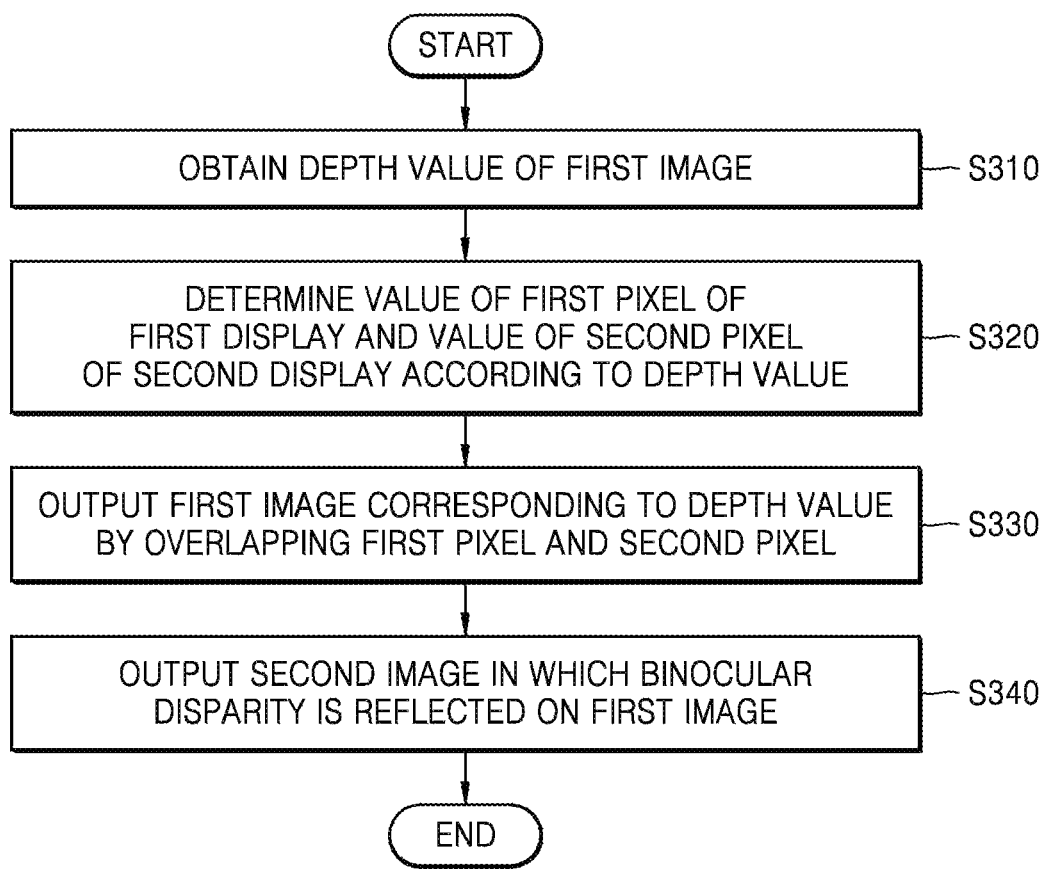
FIG. 3 is a flowchart illustrating a method of outputting a first image and a second image according to an exemplary embodiment.

FIG. 3 is a flowchart illustrating a method in which the image processing apparatus 100 outputs a first image and a second image according to an exemplary embodiment.

In operation S310, the image processing apparatus 100 according to an exemplary embodiment may obtain a depth value of the first image. The first image may include color information and depth information. The image processing apparatus 100 may receive a depth value corresponding to a first pixel included in the first image. Alternatively, the image processing apparatus 100 may determine the depth value corresponding to the first pixel included in the first image through calculation.

In operation S320, the image processing apparatus 100 according to an exemplary embodiment may determine a value of the first pixel of the first display 110 in which an optical focal distance is set to a first distance and a value of the second pixel of the second display 120 in which the optical focal distance is set to a second distance, according to the depth value obtained in operation S310. The first distance and the second distance may be different from each other. Since operation S320 corresponds to operation S220 described above, a detailed description thereof will be omitted for the sake of simplicity.

In operation S330, the image processing apparatus 100 according to an exemplary embodiment outputs the first image corresponding to the depth value by overlapping the first pixel and the second pixel. Since operation S330 corresponds to operation S230 described above, a detailed description thereof will be omitted for the sake of simplicity.

In operation S340, the image processing apparatus 100 according to an exemplary embodiment outputs the second image in which a binocular disparity is reflected on the first image that is output in operation S330. A 3D image may be output through the first image and the second image. For example, the first image may be output to a user's left eye, and the second image may be output to a user's right eye. The 3D image may be output according to a disparity between the first image and the second image.

Figure 4:
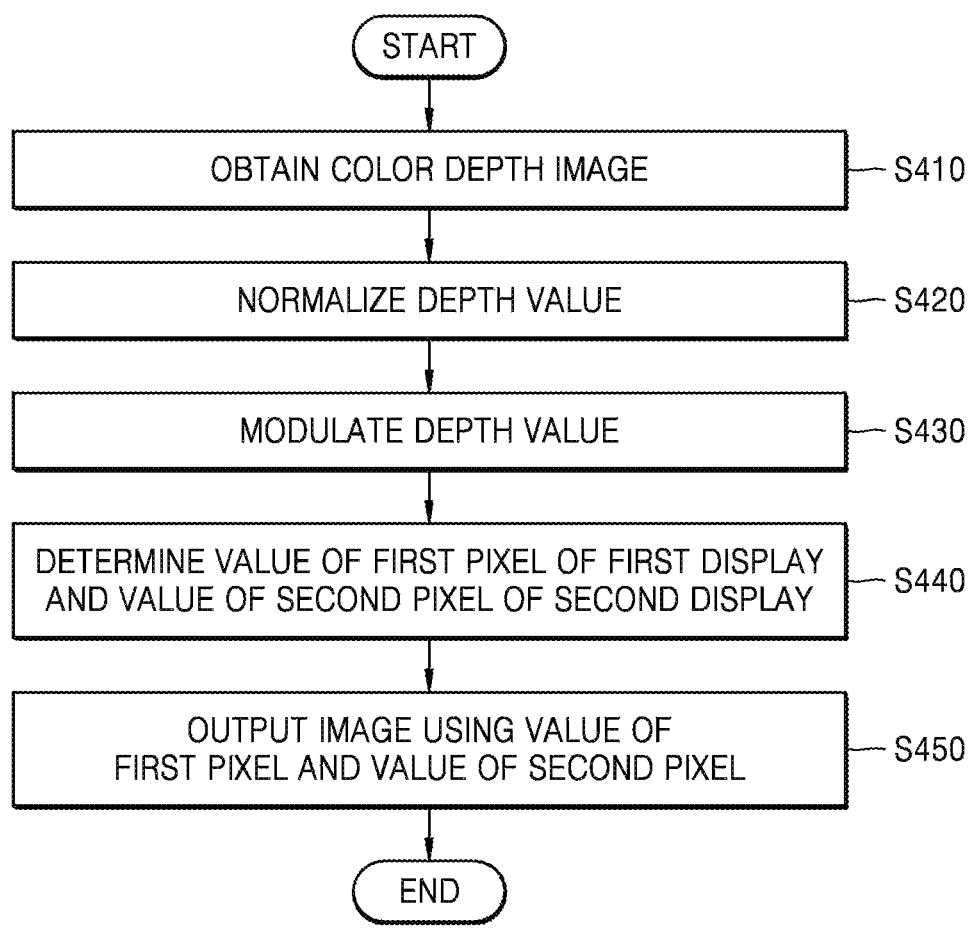
FIG. 4 is a flowchart illustrating a method of displaying an image through normalization and modulation of a depth value according to an exemplary embodiment.

FIG. 4 is a flowchart illustrating a method in which the image processing apparatus 100 displays an image through normalization and modulation of a depth value according to an exemplary embodiment.

In operation S410, the image processing apparatus 100 according to an exemplary embodiment obtains a color depth image. The color depth image may mean an image including color information and depth value information.

In operation S420, the image processing apparatus 100 according to an exemplary embodiment may normalize the depth value of the image obtained in operation S410. For example, the image processing apparatus 100 may map the depth value of the image obtained in operation S410 to a value between 0 and 1. As another example, the image processing apparatus 100 may map the depth value of the image obtained in operation S410 to a value between 0 and 255.

In operation S430, the image processing apparatus 100 according to an exemplary embodiment modulates the depth value normalized in operation S420.

The image processing apparatus 100 may determine a weight corresponding to the first display 110 and the second display 120 during a process of modulating the normalized depth value. The weight may include a first weight that indicates a ratio of a value of the first pixel of the first display 110 to an output pixel, and include a second weight that indicates a ratio of a value of the second pixel of the second display 120 to the output pixel.

For example, in a case where the depth value of the image obtained in operation S410 is mapped with a value between 0 and 255, the image processing apparatus 100 may determine the first weight as 0 and the second weight as 1 when the depth value corresponds to a range between 0 and 9, determine the first weight as 1 and the second weight as 0 when the depth value corresponds to a range between 246 to 255, determine the first weight and the second weight as 0.5 when the depth value corresponds to 128, and determine the first weight and the second weight according to a preset S-shaped function (e.g., sigmoid function) when the depth value corresponds to between 10 and 245. In other words, to display an output image, the image processing apparatus 100 may use only the first display 110 when the depth value is large to display a near distance image, use only the second display 120 when the depth value is small to display a far distance image, and may use both the first display 110 and the second display 120 when the depth value is in a middle range.

In operation S440, the image processing apparatus 100 according to an exemplary embodiment may determine the value of the first pixel of the first display 110 and the value of the second pixel of the second display 120.

Specifically, the image processing apparatus 100 may determine the value of the first pixel and the value of the second pixel using the weight determined in operation S430. For example, when the pixel value to be output is 100, the value of the first pixel may be determined as a value corresponding to '100×weight', and the value of the second pixel may be determined as a value corresponding to '100× (1−weight)'.

In operation S450, the image processing apparatus 100 according to an exemplary embodiment may output an image by using the value of the first pixel and the value of the second pixel determined in operation S450.

Figure 5:
FIG. 5 is a diagram illustrating an example in which an image is displayed through normalization and modulation of a depth value according to an exemplary embodiment.
Figure 5:
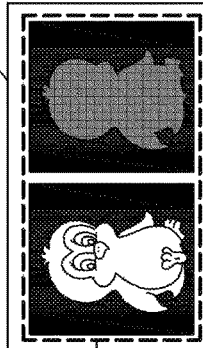
Figure 5:
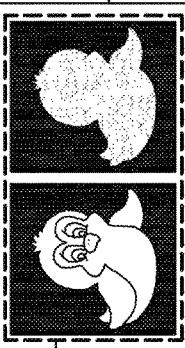
Figure 5:
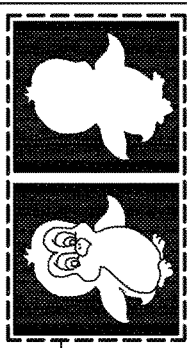
Figure 5:
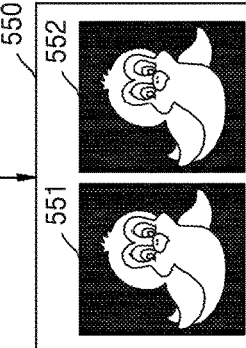
Figure 5:
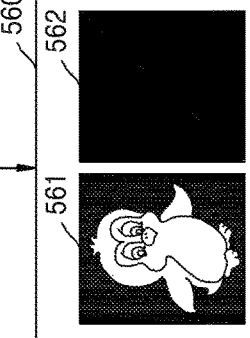
Figure 5:
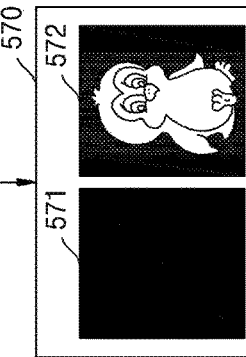

FIG. 5 is a diagram illustrating an example in which the image processing apparatus 100 displays an image through normalization and modulation of a depth value according to an exemplary embodiment.

FIG. 5 illustrates a method in which the image processing apparatus 100 renders a pixel value. When a color and a depth image are input to an input image 510, the image processing apparatus 100 may perform a normalization of the depth value and determine a weight according to an input depth value using a look up table (LUT) that is provided by using a depth value modulation function such as a sigmoid function. The sigmoid function is merely an example and the exemplary embodiments are not limited thereto. For example, the image processing apparatus 100 may use any function of mapping a modulation value (or modulated input depth) of 0 to an input depth value equal to or lower than a lower limit value (e.g., 0 to 9) of a transition region, mapping a modulation value of 255 to an input depth value equal to or greater than an upper limit value (e.g., 246 to 255) of the transition region, and mapping a modulation value having a specific slope to an input depth value between the lower limit value and the upper limit value in the transition region (e.g., 10 to 245). Hereinafter, a case in which the sigmoid function is used for convenience of explanation will be described.

Assuming that the determined weight is w, the pixel value to be output to the first display 110 and the second display 120 may be determined as [Expression 1] below.

Output1$(x,y)$=$w(x,y)$·color$(x,y)$

Output2$(x,y)$=$(1-w)(x,y))$·color$(x,y)$        [Equation 1]

Here, w(x, y) denotes a weight corresponding to each pixel position, color (x, y) denotes an input color value (or brightness value), Output1(x, y) and Output2(x, y) respectively denote output values at the corresponding pixel position of the first display 110 and the second display 120. In driving the pixel values of the first display 110 and the second display 120, the image processing apparatus 100 may output pixel values to only a display (e.g. the first display 110) that is responsible for displaying a near distance image having a near distance depth value, may output pixel values to only a display (e.g. the second display 120) that is responsible for displaying a far distance image having a far distance depth value, and may divide each pixel value of the first display 110 and the second display 120 by half to output pixel values to both the first display 110 and the second display 120 in the case of a middle depth image (e.g., an image having a middle depth value).

A case where the image processing apparatus 100 obtains a first depth image 520 will be described. The first depth image 520 may represent a far distance image. A right image of the first depth image 520 may represent a depth value. For example, the right image of the first depth image 520 may represent a closer distance as the right image becomes brighter. The image processing apparatus 100 may normalize a depth value with respect to the first depth image 520 (operation S520), perform modulation according to the depth value (operation S530), and determine a weight for the first display 110 and the second display 120 according to the depth value (operation S540). The image processing apparatus 100 may output images to the first display 110 and the second display 120 according to a value of the determined weight. The image processing apparatus 100 may output a first output image 570 corresponding to the first depth image 520. A pixel value (e.g. a brightness value) of a first far distance image 572 output from the second display 120 corresponding to the far distance image may be greater than a pixel value of a first near distance image 571 output from the first display 110 corresponding to the near distance image.

A case where the image processing apparatus 100 obtains a second depth image 530 will be described. The second depth image 530 may represent a middle distance image. A right image of the second depth image 530 may represent a depth value. For example, the right image of the second depth image 530 may represent a closer distance as the right image becomes brighter. The image processing apparatus 100 may normalize a depth value with respect to the second depth image 530 (operation S520), perform modulation according to the depth value (operation S530), and determine a weight for the first display 110 and the second display 120 according to the depth value (operation S540). The image processing apparatus 100 may output an image to the first display 110 and the second display 120 according to a value of the determined weight. The image processing apparatus 100 may output a second output image 550 corresponding to the second depth image 530. A pixel value (e.g. a brightness value) of a second far distance image 552 output from the second display 120 corresponding to the far distance image may be similar to a pixel value of a second near distance image 551 output from the first display 110 corresponding to the near distance image.

A case where the image processing apparatus 100 obtains a third depth image 540 will be described. The third depth image 540 may represent a near distance image. A right image of the third depth image 540 may represent a depth value. For example, the right image of the third depth image 540 may represent a closer distance as the right image becomes brighter. The image processing apparatus 100 may normalize a depth value of the third depth image 540 (operation S520), perform modulation according to the depth value (operation S530), and determine a weight for the first display 110 and the second display 120 according to the depth value (operation S540). The image processing apparatus 100 may output an image to the first display 110 and the second display 120 according to a value of the determined weight. The image processing apparatus 100 may output a third output image 560 corresponding to the third depth image 540. A pixel value of a third far distance image 562 output from the second display 120 corresponding to the far distance image may be smaller than a pixel value of a third near distance image 561 output from the first display 110 corresponding to the near distance image.

Figure 6:
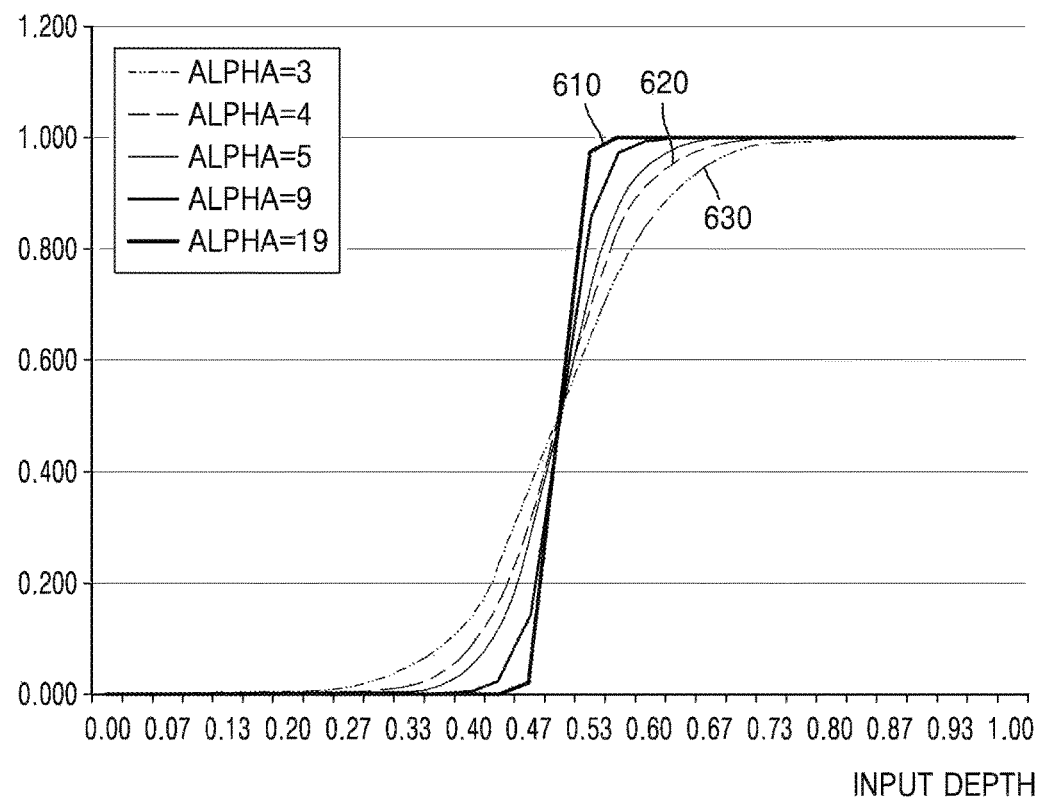
FIG. 6 is a diagram illustrating a method of performing modulation of a depth value according to an exemplary embodiment.

FIG. 6 is a diagram illustrating a method in which the image processing apparatus 100 performs modulation of a depth value according to an exemplary embodiment.

FIG. 6 illustrates some embodiments of sigmoid functions for depth value modulation. A function used in the embodiment is expressed as [Equation 2] below, $$y = \frac{1}{1+e^{-\alpha \cdot x}} \quad \text{[Equation 2]}$$

where x may denote an input depth value and y may denote a modulation depth value obtained by a depth value modulation function. Further, a value of α may be a parameter value for determining an inclination of a variation region.

For example, a range of a depth value at which the first display 110 and the second display 120 are displayed at the same time may be narrowest in a first sigmoid function 610 among the first sigmoid function 610, a second sigmoid function 620, and a third sigmoid function 630 and may be widest in the third sigmoid function 630.

For example, it is assumed that a depth value of an image to be output changes from a sufficiently great value (e.g., infinity) to a sufficiently small value (e.g., 0), and the image processing apparatus 100 operates according to the first sigmoid function 610, the first display 110 and the second display 120 may be simultaneously displayed to output the image only in a period having the depth value from 5 m to 3 m. When the image processing apparatus 100 operates according to the second sigmoid function 620, the first display 110 and the second display 120 may be simultaneously displayed to output the image only in a period having the depth value of 7 m, and when the image processing apparatus 100 operates according to the third sigmoid function 630, the first display 110 and the second display 120 may be simultaneously displayed to output the image only in a period having the depth value from 10 m to 1 m.

Also, in a transition region where the first display 110 and the second display 120 are simultaneously displayed, an S-shaped curved line or a straight line having a predetermined inclination may be used in combination. For example, the first sigmoid function 610 may have a shape approximating the straight line, and the third sigmoid function 630 may have a shape approximating the S-shaped curve.

A sigmoid function shown in FIG. 6 is an example of a relationship between an output depth and an input depth, and the image processing apparatus 100 may display an image according the sigmoid function. However, an operation of the image processing apparatus 100 is not limited to the sigmoid function shown in FIG. 6, and the image processing apparatus 100 may operate based on any other function that maps an input depth and an output depth such that a weight having a value of zero is mapped to a depth value of 0 to a value less than a lower limit value (e.g., 10) of a transition region, a weight having a value of 255 is mapped to a depth value from a value greater than an upper limit value (e.g., 245) of the transition region to 255, and a weight having a value of a specific slope is mapped to a depth value in the transition region (e.g., 10 to 245).

Figure 7:
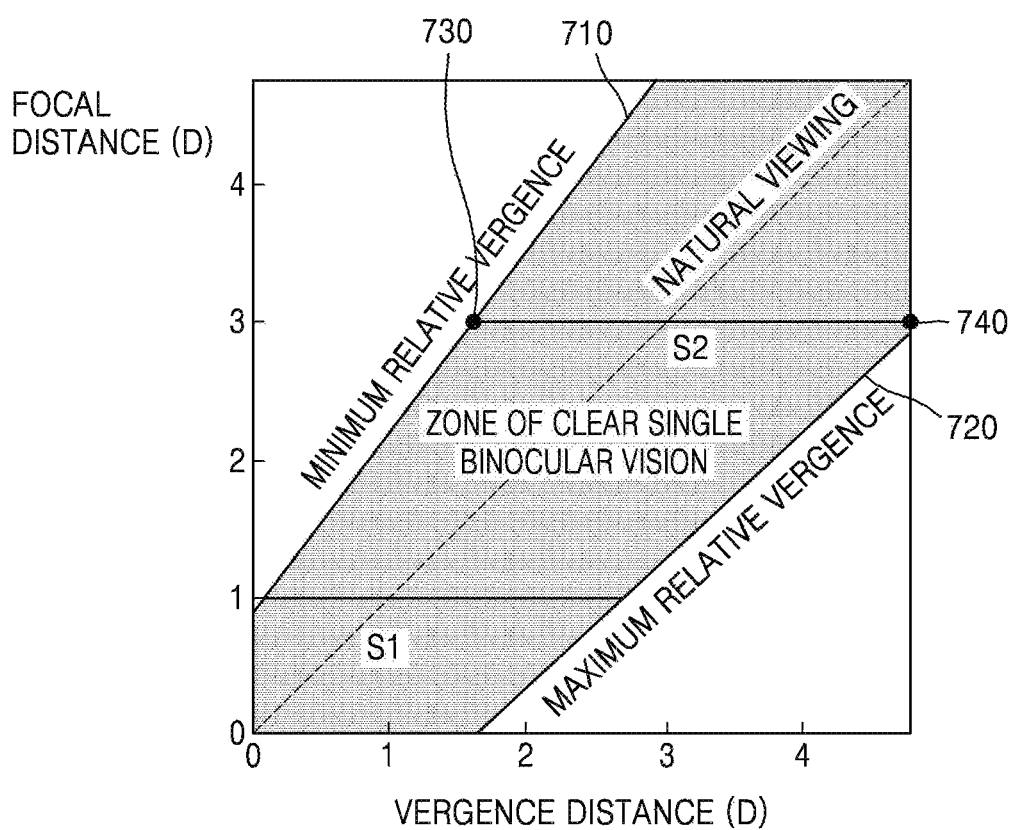
FIG. 7 is a diagram illustrating a focal distance related characteristic used in performing modulation according to an exemplary embodiment.

FIG. 7 is a diagram illustrating a focal distance related characteristic with respect to vergence distance used in performing modulation according to an exemplary embodiment.

FIG. 7 illustrates a zone of comfort (ZOC). The ZOC may refer to a zone in which a clear single binocular vision may be provided. The ZOC may be used to determine a display position in representing a depth region using a multi-plane display. In FIG. 7, a 1-diopter focal plane covers a range of S1 which is from 0 to about 2.5 diopters, and a 3-diopter focal plane covers a range of S2 which is from about 1.5 diopters to about 4.8 diopters. In this case, even if only two focal planes are used in the ZOC, a convergence position of 0 to about 4.8 diopters may be covered.

A first line 710 may represent a minimum value (or a minimum relative vergence) of the ZOC. A second line 720 may represent a maximum value (or a maximum relative vergence) of the ZOC. For example, a 3-diopter focal plane may cover from 1.5 diopters indicated by a first point 730 to 4.8 diopters indicated by a second point 740.

The ZOC may be referred to when the image processing apparatus 100 performs modulation of a depth value. In an exemplary embodiment, the image processing apparatus 100 uses the ZOC to determine a minimum value and a maximum value of a depth value at which images of the first display 110 and the second display 120 are simultaneously output. For example, the minimum value and the maximum value of the depth value at which images of the first display 110 and the second display 120 are simultaneously output may be determined within the ZOC. As another example, the minimum value and the maximum value of the depth value at which images of the first display 110 and the second display 120 are simultaneously output may be determined as values out of a preset range of the ZOC.

The image processing apparatus 100 may provide a pixel rendering method that expresses a natural image through a multi-focus display method that matches focus information between a real world and a virtual image. For example, in the case of outputting an image in which a depth value continuously changes, the natural image may be provided by controlling a range of a depth value at which images of a plurality of displays having different optical focal distances are simultaneously displayed. For example, when the image processing apparatus 100 includes the first display 110 having an optical focal distance of 1 m and the second display 120 having an optical focal distance of 11 m, images of the first display 110 and the second display 120 may be simultaneously displayed at the depth value being in a range of 5 m to 7 m. When the depth value of the image to be output is smaller than 5 m, a weight applied to the first display 110 that is a near distance display may be 100% and a weight applied to the second display 120 that is a far distance display may be 0%. Alternatively, if the depth value of the image to be output is greater than 7 m, the weight applied to the first display 110 that is the near distance display may be 0% and the weight applied to the second display 120 that is the far distance display may be 100%.

Figure 8:
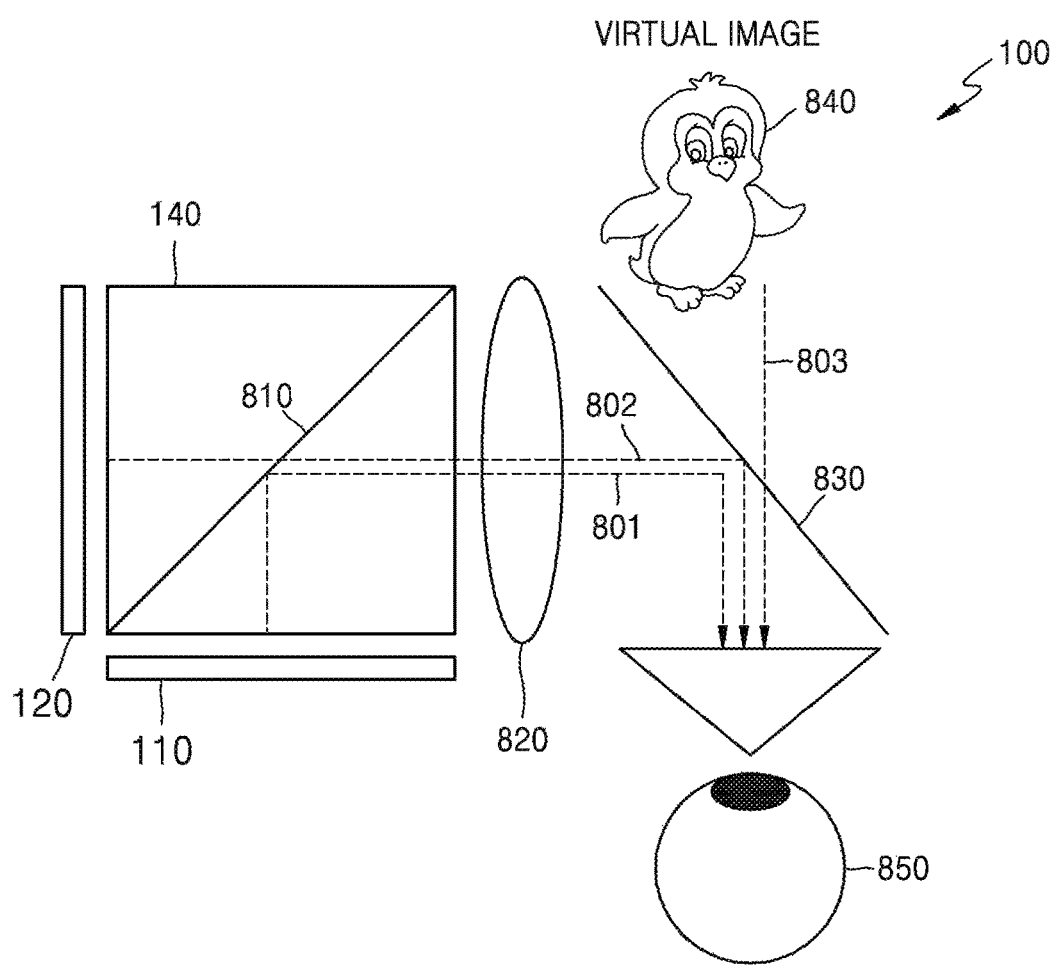
FIG. 8 is a diagram illustrating an example in which a see-through type image is displayed according to an exemplary embodiment.

FIG. 8 is a diagram illustrating an example in which the image processing apparatus 100 displays a see-through type image according to an exemplary embodiment.

Referring to FIG. 8, the first display 110 may include an image forming device (or an image displaying device) for forming and/or displaying a 1-1th image, and the second display 120 may include an image forming device (or an image displaying device) for forming and/or displaying a 1-2th image.

The image processing apparatus 100 may be a kind of see-through type optical system. The image processing apparatus 100 may transfer and/or guide an external image (not shown) from the outside of the image processing apparatus 100 to a user's visual organ 850 through a second optical member 830. The 1-1th image, the 1-2th image, and the external image may be simultaneously output to the user's visual organ 850. The user's visual organ 850 may be a user's eye.

The image processing apparatus 100 may transmit a plurality of images, that is, the 1-1th image, the 1-2th image, and the external image to the user's visual organ 850 through different paths. For example, the image processing apparatus 100 may transfer and/or guide the 1-1th image through light 801 of a first path, the 1-2th image through light 802 of a second path, and the external image through light 803 of a third path to the user's visual organ 850. The light 801 of the first path may be light generated (or transferred) in the first display 110, and may be light corresponding to the 1-1th image. The light 802 of the second path may be light generated (or transferred) in the second display 120, and may be light corresponding to the 1-2th image. The light 803 of the third path may be the light transmitted through the image processing apparatus 100 from the outside of the image processing apparatus 100 and may correspond to the external image.

The 1-1th and 1-2th images may generate a virtual image 840. Also, the virtual image 840 may overlap with the external image and may be transferred to the user's visual organ 850.

The image processing apparatus 100 may include a multipath optical member that provides an optical multipath. For example, the image processing apparatus 100 may include a first optical member 810 and a second optical member 830.

The light 801 of the first path may travel by being reflected from, for example, the first optical member 810. The light 802 of the second path may transmit through, for example, the first optical member 810 and may travel by being reflected from the second optical member 830. The light 803 of the third path may travel by transmitting through, for example, the second optical member 830. The first optical member 810 and/or the second optical member 830 may be a transflective member. As an example, the first optical member 810 and/or the second optical member 830 may be a polarization beam splitter (PBS), a beam splitter (BS), a transflective film, etc.

The first optical member 810 and the second optical member 830 may include the same material or different materials. For example, the second optical member 830 may be a type of a mirror or a half mirror, and the first optical member 810 may be a type of a prism.

The image processing apparatus 100 may include a lens 820. For example, the lens 820 may be configured as a transparent glass body that refracts light transferred to the lens 820. The lens 820 may be positioned between the image converging member 140 and the second optical member 830.

The 1-1th image transferred by the light 801 of the first path may be an image formed and output by the first display 110 in the image processing apparatus 100. Also, the 1-2th image transferred by the light 802 of the second path may be an image formed and output by the second display 120 in the image processing apparatus 100. The 1-1th or 1-2th image may include virtual reality or virtual information to be displayed.

The external image transferred by the light 803 of the third path may be an image of an outside facing the user through the image processing apparatus 100. The external image may include an image of a foreground facing the user, and may include a predetermined background. Such an external image may be an image of a real world. Accordingly, the image processing apparatus 100 (or a multiple image and/or see-through type display device) according to an exemplary embodiment may be applied to implement augmented reality (AR) or mixed reality (MR). In this case, the display device may be a near-eye AR display device.

The first display 110 and/or the second display 120 may include, for example, a spatial light modulator (SLM). The SLM may be a transmissive optical modulator or a reflective optical modulator, or a transflective optical modulator. As an example, the SLM may include a liquid crystal on silicon (LCoS) panel, a liquid crystal display (LCD) panel, a digital light projection (DLP), etc. The DLP panel may include a digital micromirror device (DMD). The first display 110 and/or the second display 120 may include the transmissive optical modulator. Although not shown, the first display 110 and/or the second display 120 may further include a light source for irradiating light. According to embodiments, the first display 110 and/or the second display 120 may include a light emitting diode (LED) display device or an organic LED (OLED) display device. The image implemented by using the first display 110 and/or the second display 120 may be a two-dimensional (2D) image or a three-dimensional (3D) image. The 3D image implemented by using the first display 110 and/or the second display 120 may include a hologram image, a stereo image, a light field image, an integral photography (IP) image, or the like. The first display 110 and/or the second display 120 may be a kind of a display device or a micro-display device, and the configuration thereof is not limited to that described above, and may vary.

Figure 9:
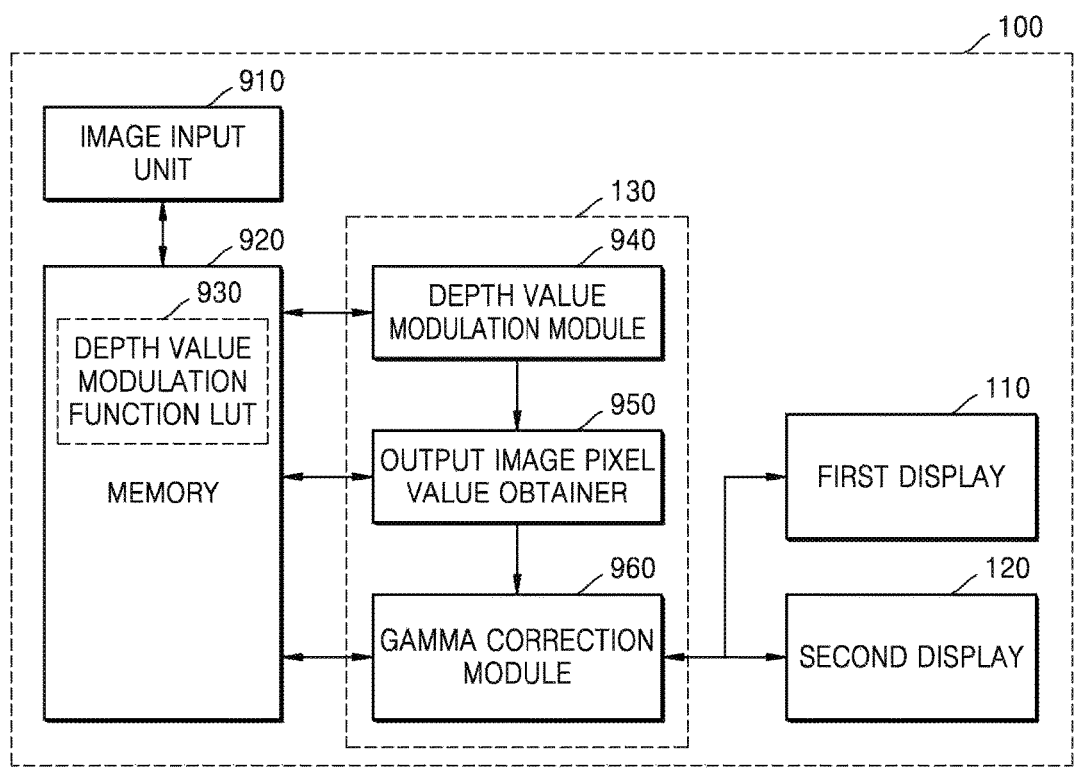
FIG. 9 is a block diagram illustrating a device that outputs an image using a look up table (LUT) stored in a memory according to an exemplary embodiment.

FIG. 9 is a block diagram illustrating the image processing apparatus 100 that outputs an image using a look up table (LUT) stored in a memory according to an exemplary embodiment.

As shown in FIG. 9, the image processing apparatus 100 may include an image input unit 910, a memory 920, a depth value modulation module 940, an output image pixel value obtainer 950, a gamma correction module 960, the first display 110, and the second display 120. However, it will be understood by one of ordinary skill in the art that other general-purpose components in addition to components shown in FIG. 9 may be further included in the image processing apparatus 100. Alternatively, it will be understood by one of ordinary skill in the art that according to another exemplary embodiment, some of the components shown in FIG. 9 may be omitted.

The image input unit 910 may provide or receive an input of a color depth image. The memory 920 stores the color depth image received from the image input unit 910. An amount of data to be stored may vary depending on a resolution of the received image. The memory 920 may also store a depth value modulation function look up table 930 based on depth value modulation data. The depth value modulation module 940 may modulate a depth value using the depth value modulation data stored in the depth value modulation function LUT 930 and data of the color depth image stored in the memory 920.

The output image pixel value obtainer 950 may obtain pixel values of the first display 110 and the second display 120 using the data of the color depth image stored in the memory 920 and depth value modulation data (e.g., multiplying the data of the color depth image by the depth value modulation data).

The gamma correction module 960 may perform gamma correction using the pixel values of the first display 110 and the second display 120 and obtain pixel values to be output to the first display 110 and the second display 120.

The first display 110 and the second display 120 may output images based on the obtained pixel values.

Figure 10:
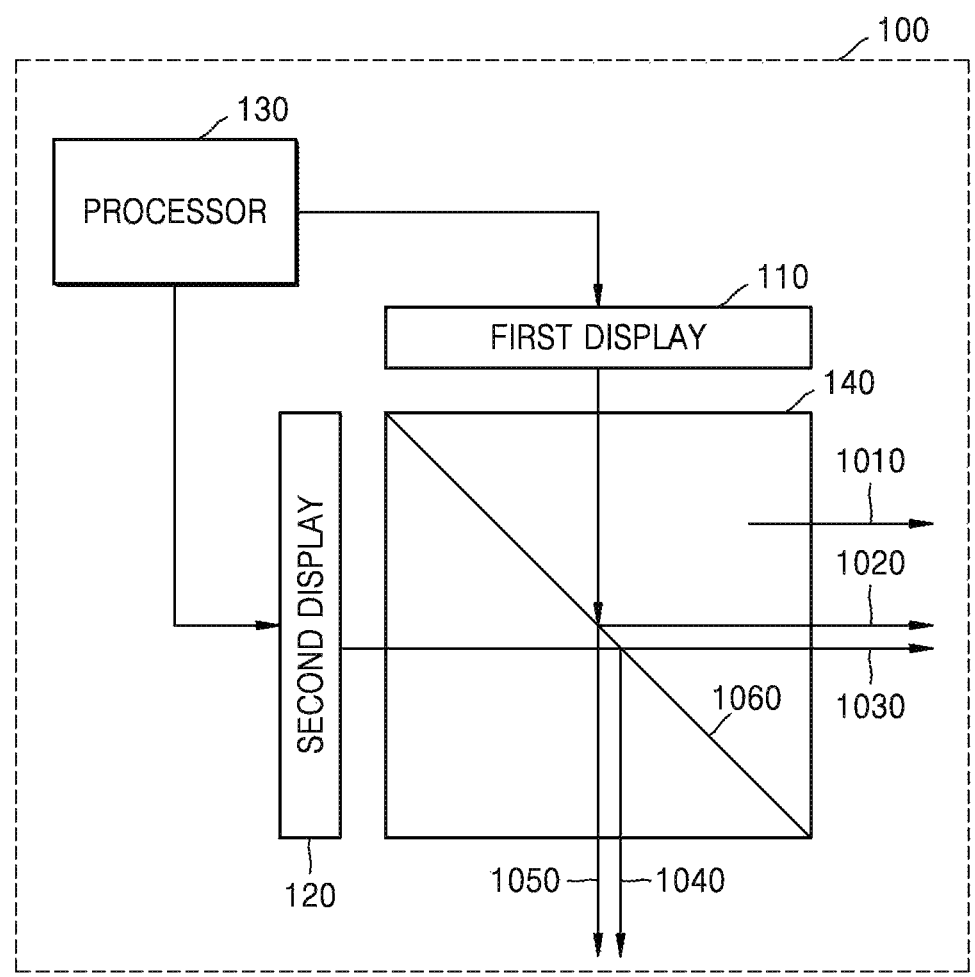
FIG. 10 is a diagram showing an example in which a device outputs an image via two displays according to an exemplary embodiment.

FIG. 10 is a diagram showing an example in which the image processing apparatus 100 outputs an image using two displays according to an exemplary embodiment.

In FIG. 10, for illustrative purposes, an example in which the image processing apparatus 100 including the first display 110, the second display 120, the processor 130, and the image converging member 140 outputs an image will be described.

The first display 110 outputs a 1-1th image. The second display 120 outputs a 1-2th image. Also, the first display 110 and the second display 120 may be controlled by the processor 130.

The 1-1th image output by the first display 110 and the 1-2th image output by the second display 120 may be output through different paths. For example, the 1-1th image may be output through light 1020 of a first path, and the 1-2th image may be output through light 1030 of a second path. The image processing apparatus 100 may output the image in an output direction 1010 through the light 1020 of the first path and the light 1030 of the second path.

The image converging member 140 may include an optical member 1060 that provides an optical multipath.

The image converging member 140 may converge the image output from the first display 110 and the image output from the second display 120 and output the converged image as a single image. For example, the image converging member 140 may overlap the image output from the first display 110 and the image output from the second display 120 and output the image in the output direction 1010.

The light 1020 of the first path may travel by being reflected in, for example, the optical member 1060. The light 1030 of the second path may travel by transmitting through, for example, the optical member 1060. Alternatively, light 1050 of a third path may travel by transmitting through, for example, the optical member 1060. Light 1040 of a fourth path may travel by being reflected in, for example, the optical member 1060. The light 1050 of the third path and the light 1040 of the fourth path, which travel in a direction other than the output direction 1010, may be controlled to disappear.

The optical member 1060 may be a transflective member. As an example, the optical member 1060 may be a polarization beam splitter (PBS), a beam splitter (BS), a transflective film, or the like.

The above-described image processing method according to exemplary embodiments may be implemented in a program that may be executed by a computer (e.g., a general purpose digital computer), and the program may be stored in a computer-readable recording medium. Such a computer readable recording medium includes a storage medium such as a magnetic storage medium (e.g., read-only memory (ROM), floppy disk, hard disk, etc.), optical reading medium (e.g., compact disc (CD)-ROM, digital versatile disc (DVD), etc.).

At least one of the components, elements, modules or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An apparatus for processing an image, the apparatus comprising:
   a first display of which an optical focal distance is a first distance;
   a second display of which an optical focal distance is a second distance;
   a processor configured to obtain a depth value of a first image to be output, and determine a first value of a first pixel of the first display and a second value of a second pixel of the second based on the depth value, the first distance and the second distance; and
   an image converging member configured to overlap the first pixel and the second pixel and output the first image corresponding to the depth value.

2. The apparatus of claim 1, wherein the processor is configured to control a range of the depth value, at which the first pixel of the first display and the second pixel of the second display are simultaneously displayed, to be within a predetermined range.

3. The apparatus of claim 2, wherein when the second distance is greater than the first distance, an upper limit of the predetermined range is smaller than the second distance, and a lower limit of the predetermined range is greater than the first distance.

4. The apparatus of claim 1, wherein the first distance and the second distance are set according to physical characteristics of the first display and the second display, respectively.

5. The apparatus of claim 1, wherein the second distance is greater than the first distance, and
wherein the processor is configured to determine the first value of the first pixel to be greater than the second value of the second pixel in response to an average value of the first distance and the second distance being greater than the depth value.

6. The apparatus of claim 1, wherein the second distance is greater than the first distance, and
wherein the processor is configured to determine a weight applied to the first value of the first pixel to be greater than a weight applied to the second value of the second pixel in response to an average value of the first distance and the second distance being greater than the depth value.

7. The apparatus of claim 1, wherein the first value of the first pixel comprises a brightness value of the first pixel and the second value of the second pixel comprises a brightness value of the second pixel.

8. The apparatus of claim 1, wherein the processor is configured to generate an additional image in which a binocular parallax is reflected on the first image, and
wherein the image converging member is configured to output the additional image.

9. The apparatus of claim 8, wherein the first image is output to one of a left eye and a right eye of a user and the additional image is output to another one of the left eye and the right eye of the user.

10. The apparatus of claim 1, wherein the processor is configured to determine the first value of the first pixel and the second value of the second pixel corresponding to the depth value according to a look up table.

11. A method for processing an image, the method comprising:
obtaining a depth value of a first image to be output;
determining, based on the depth value, a first value of a first pixel of a first display of which an optical focal distance is a first distance and determining a second value of a second pixel of a second display of which an optical focal distance is a second distance; and
overlapping the first pixel and the second pixel to output the first image corresponding to the depth value.

12. The method of claim 11, wherein the determining comprises controlling a range of the depth value at which the first pixel of the first display and the second pixel of the second display are simultaneously displayed to be within a predetermined range.

13. The method of claim 12, wherein when the second distance is greater than the first distance, an upper limit of the predetermined range is smaller than the second distance, and a lower limit of the predetermined range is greater than the first distance.

14. The method of claim 11, wherein the first distance and the second distance are set according to physical characteristics of the first display and the second display, respectively.

15. The method of claim 11, wherein the second distance is greater than the first distance, and
wherein the determining comprises determining the first value of the first pixel to be greater than the second value of the second pixel in response to an average value of the first distance and the second distance being greater than the depth value.

16. The method of claim 11, wherein the second distance is greater than the first distance, and
wherein the determining comprises determining a weight applied to the first value of the first pixel to be greater than a weight applied to the second value of the second pixel in response to an average value of the first distance and the second distance being greater than the depth value.

17. The method of claim 11, wherein the first value of the first pixel comprises a brightness value of the first pixel and the second value of the second pixel comprises a brightness value of the second pixel.

18. The method of claim 11, further comprising outputting an additional image in which a binocular parallax is reflected on the first image.

19. The method of claim 18, wherein the first image is output to one of a left eye and a right eye of a user and the additional image is output to another one of the left eye and the right eye of the user.

20. The method of claim 11, wherein the determining comprises determining the first value of the first pixel and the second value of the second pixel corresponding to the depth value according to a look up table.

21. A non-transitory computer-readable recording medium that stores a program which, when executed by a computer, implements the method of claim 11.

22. A method of processing an image, the method comprising:
receiving an input image including a depth value;
modulating the depth value to be within a predetermined range based on a first optical focal distance of a first display and a second optical focal distance of a second display;
determining a first value of a first pixel of the first display and a second value of a second pixel of the second display according to the modulated depth value, the second pixel having a position corresponding to a position of the first pixel; and
outputting an output image based on the first value of the first pixel and the second value of the second pixel.

23. The method of claim 22, further comprising normalizing the depth value prior to the modulating.

24. The method of claim 22, wherein the depth value is modulated by using depth value modulation data stored in a look up table.

25. The method of claim 24, wherein the look up table is provided by using a depth value modulation function comprising a sigmoid function.

* * * * *